United States Patent
Kuhne

[11] Patent Number: 5,289,737
[45] Date of Patent: Mar. 1, 1994

[54] ELASTIC CLUTCH

[75] Inventor: Viktor Kuhne, Bopfingen, Fed. Rep. of Germany

[73] Assignee: J. M. Voith GmbH, Heidenheim, Fed. Rep. of Germany

[21] Appl. No.: 795

[22] Filed: Jan. 5, 1993

Related U.S. Application Data

[63] Continuation of Ser. No. 748,827, Aug. 22, 1991, abandoned.

[30] Foreign Application Priority Data

Aug. 25, 1990 [DE] Fed. Rep. of Germany ....... 4026996

[51] Int. Cl.$^5$ .................. F16D 3/12; F16D 3/80
[52] U.S. Cl. .................. 74/574; 192/106.2; 464/66
[58] Field of Search ............ 192/106.2; 74/574; 464/66, 67, 68

[56] References Cited

U.S. PATENT DOCUMENTS

| | | | |
|---|---|---|---|
| 4,347,717 | 9/1982 | Lamarche | 464/64 |
| 4,484,898 | 11/1984 | Kohno | 464/68 X |
| 4,530,673 | 7/1985 | Lamarche | 464/68 X |
| 4,585,427 | 4/1986 | Lamarche | 464/68 X |
| 4,790,792 | 12/1988 | Bopp | 464/66 |
| 4,850,932 | 7/1989 | Kagiyama et al. | 74/574 X |
| 4,884,996 | 12/1989 | Schmitt et al. | 464/68 |
| 4,891,033 | 1/1990 | Heyser | 464/68 |
| 4,944,499 | 7/1990 | Tojima | 74/574 X |
| 5,032,107 | 7/1991 | Umeyama et al. | 192/106.2 X |

FOREIGN PATENT DOCUMENTS

| | | | |
|---|---|---|---|
| 0136825 | 4/1985 | European Pat. Off. | |
| 3841639 | 12/1989 | Fed. Rep. of Germany | |
| 0101537 | 5/1988 | Japan | 74/574 |
| 2052682 | 1/1981 | United Kingdom | |

OTHER PUBLICATIONS

European Search Report mailed Nov. 18, 1992.

*Primary Examiner*—Rodney H. Bonck
*Attorney, Agent, or Firm*—Baker & Daniels

[57] ABSTRACT

In an elastic clutch of disk design, particularly a split flywheel for an internal combustion engine, a coupling including an oblong spring is arranged between two coupling halves that are mutually rotatable. Essentially stretched in relaxed condition, the spring is subdivided in two or more partial sections by wedge-shaped spring cups, the longitudinal axes of which partial sections have relative to one another a buckled arrangement. Obtained in this way is a spring favorable for specific operating conditions, with a low spring stiffness, but with the spring being composed of essentially straight-line partial sections. Provided thereby is a spring that can be manufactured at low cost, which, in operation, is favorably stressed and not subjected to any wear.

18 Claims, 1 Drawing Sheet

ELASTIC CLUTCH

This is a continuation of application Ser. No. 07/748,827, filed Aug. 22, 1991 and now abandoned.

BACKGROUND OF THE INVENTION

The invention concerns an elastic clutch of disk design, particularly suited for a split flywheel for an internal combustion engine. A clutch for this type is known from the German patent disclosure 38 41 639.

The prior clutch features mutually engaging clutch halves between which a helical spring is inserted that is relatively long and extends across a large angular area, i.e., is installed in a curved condition. For that purpose, the one clutch half features for the radial and axial guidance an outer area that is round and adapted to the spring windings. Such a spring arrangement is characterized in that for specific operating conditions there are favorable spring properties achieved, namely when large amplitudes of torsional oscillation are to be absorbed and damped with low spring stiffness. But due to its curved installation, the spring is heavily forced outward in a radial direction during the twisting of the two clutch halves. Despite the lubricant contained in the clutch, this leads to heavy frictional damping in the outer winding area and to an uncontrollable adverse effect on the spring characteristic. Additionally, wear occurs on the bearing surface and on the spring, and the curved spring itself is unfavorably stressed on its radially inner windings. In terms of manufacture, it is expensive to produce a high-precision curved spring.

The problem underlying the invention consists is a clutch of the type discussed above where a spring that can be produced at low cost is arranged in such a manner that it is protected from wear and also favorably stressed, while the known is favorable spring properties are retained.

SUMMARY OF THE INVENTION

The above problems are solved, according to the invention, by providing an oblong spring that is subdivided in the axial direction into portions separated by at least one wedge-shaped cup member inserted between adjacent windings in the outer winding area.

Provided is an oblong spring in the radially outer windings of which there is at least one wedge-shaped member inserted, so that the spring itself is subdivided into at least two sub-sections, with angular alignment being imparted to the longitudinal axes of these partial areas relative to one another. This angling occurs through spreading adjacent spring windings, so that overall a form of the entire spring curved in polygon fashion is created.

The advantage of this arrangement is constituted by the fact that, in the preferred embodiment, the spring itself is integral and can be produced with an essentially straight-line longitudinal axis in its unstressed condition, with an adaptation to the curvature of the cutout in the coupling being effected just before installation by insertion of wedge-shaped spring cups. As the spring is stressed, the wedge-shaped spring cups move along with the windings along the housing enveloping the spring because the wedge-shaped spring cups are not fastened to the surrounding housing, but are free to move. Therefore, the sub-sections of the spring are essentially stretched sections and are thus subject to a favorable load.

The spring arrangement may be of a design such that each section of the spring is curved less than the entire spring, based on its total length. Each spring section between two spring cups may also be of a straight-line design, i.e., with an infinite radius of curvature. The wedge type spring cup may be fashioned as a radial guide of the spring at the point of buckle as a lateral guide within the cutout in the coupling halves. What is achieved thereby is that the windings of the spring have no metal-to-metal contact with the surrounding parts, so that neither friction nor wear will occur. The spring may be provided with spring plates at its ends and, as is known, guide pieces may be inserted loosely between the radially outer winding area of the sections and the outer definition of the cutout, in order to prevent a buckling under load. The wedge-shaped spring cup may preferably consist of a material which is resistant to temperature and wear as well as lubricants.

BRIEF DESCRIPTION OF THE DRAWING

An embodiment of the invention will be more fully described hereafter with the aid of the drawing, wherein.

DETAILED DESCRIPTION

Figure 1:
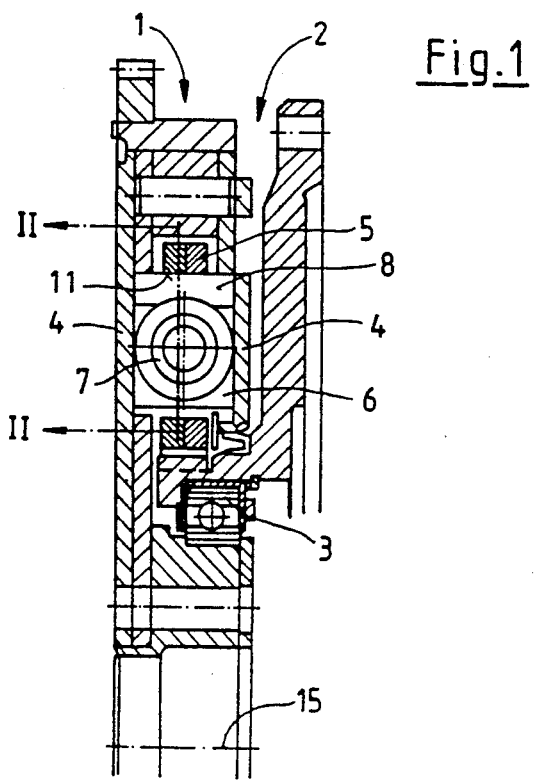
FIG. 1 is a longitudinal sectional view of an elastic coupling in accordance with an embodiment of the invention.

FIG. 1 shows half of a longitudinal section through an elastic coupling comprising a first coupling half 1 and a second coupling half 2 forming the two masses of a dual-mass flywheel of disk design. Coupling half 1 is connected with an internal combustion engine (not shown), whereas the second coupling half 2 is connected by way of a friction clutch with a gear box of a vehicle drive (not illustrated). The first coupling half 1 features two side disks 4 into which plunges a center disk 5 pertaining to the second coupling half 2 and which, in turn, is rotatably mounted on the first coupling half 1, in the hub area, by way of an anti-friction bearing 3. Arranged between center disk 5 and side disks 4 is an elastic coupling element fashioned as a helical spring 7. Both center disk 5 and also side disks 4 feature for that purpose corresponding cutouts 6 in which spring 7 is received and is oriented in the circumferential direction.

Figure 2:
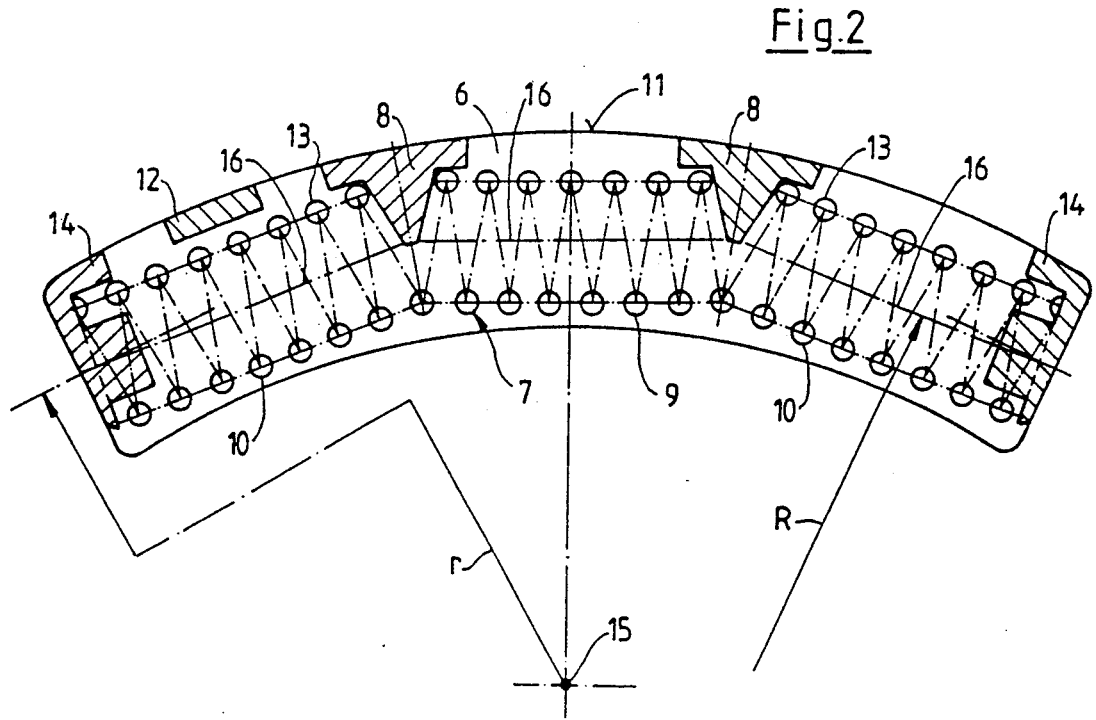
FIG. 2 is a cross sectional view of the spring area along the section line II—II in FIG. 1.

FIG. 2 shows a schematic cross section through the spring area, along line II—II in FIG. 1. Visible is the cutout 6 in center disk 5 as well as spring 7. Contained in the outer winding areas 13 of spring 7 are two wedge-shaped spring cups 8. These subdivide spring 7 into three partial areas 9, 10, which through the radially outer spreading between two adjacent windings assume a buckled position to one another. Supporting spring plates 14 are located at the two ends of spring 7 in cutout 6.

The wedge-shaped spring cups 8 are so arranged between the outer windings 13 of spring 7 and the outer limit of cutout 6 that a support of spring 7 will ensue, without the spring itself making metallic contact with the parts of the spring. Not connected with the center disk 5, i.e., the cutout 6, the wedge-shaped spring cups 8 are capable of moving along with spring 7. In the process, while spring 7 is stressed, they maintain the buckled position of the longitudinal axes 16 of the individual partial areas 9, 10 of spring 7 relative to one another. Accomplished thereby is that the radius of curvature R of each section 9, 10 remains very large, or each area even retains the stretched position (radius of curvature R/infinity) and yet, the entire spring arrangement between the two spring plates 14 has a much smaller radius of curvature, the center point of which coincides normally with the axis of rotation 15 of the coupling. This makes it possible to provide an overall curved spring 7 which, however, is composed of favorably stressed stretched partial areas 9, 10.

In each partial area 9, 10, of the spring, a loosely inserted guide piece 12 may be provided between the outer winding area 13 and the inner definition of the cutout 6, which guide piece 12 additionally prevents a radially outward buckling.

The wedge type spring cup is preferably made of a non-metallic material which is light-weight, resistant to abrasion, high temperature and to the lubricant that is normally contained in the coupling, under retention of good sliding properties. For example, a plastic such as polyethylene is acceptable. Furthermore, the wedge-shaped spring cup may be so designed that it extends from outside up to the radially inner winding area of the spring.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A coupling for an elastic disk-type clutch with two halves, for two masses of a split flywheel for an internal combustion engine, which masses are allowed a limited mutual rotation against the force of elastic coupling elements, said elastic coupling elements arranged in several cutouts distributed across the circumference, each said elastic coupling element comprising a single, integral oblong helical spring subdivided in axial direction into partial sections by means of at least one wedge-shaped spring cup forming a bend in said spring separating said partial sections, the wedge-shaped spring cup being disposed between two adjacent windings of the spring in the outer winding area thereof, each said partial section defining a straight-line longitudinal axis having a radius of curvature that is substantially infinite, the wedge-shaped spring cup forming a side guide of the spring within the two halves, the cutout supporting spring plates adapted to support ends of the spring.

2. The coupling of claim 1 wherein the radius of curvature of the spring, with at least one wedge-shaped spring cup, in place, is smaller than the radius of curvature of the partial sections of the spring.

3. The coupling of claim 1 wherein the wedge-shaped spring cup forms the radially outer support of the outer winding area of the spring at an outer definition of the cutout.

4. The coupling of claim 1 wherein each of the spring plates includes a cylindrical projection receiving ends of the spring.

5. The coupling of claim 1 further comprising guide pieces adjacent the partial sections of the spring and positioned for radially outer support on the outer definition of the cutout.

6. The coupling of claim 1 further being adapted to hold lubricant and wherein the wedge-shaped spring cup comprises a material having a light specific gravity which is resistant to abrasion, high temperature and, in the presence of a lubricant within the coupling, the material is resistant to the lubricant, the material further having high strength and good sliding properties.

7. A coupling for elastic disk-type clutch comprising:
two halves allowed a limited degree of rotation relative to each other, said halves defining an axis of rotation;
an oblong, helical spring disposed between said first and second halves for elastically limiting relative motion between said first and second halves; and
at least one wedge-shaped cup means for subdividing said spring in an axial direction into a plurality of sub-sections, said cup means being disposed between two adjacent windings of said spring in a radially outer winding area relative to said axis;
individual said sub-sections being integral with each other and being substantially straight and disposed in a substantially unstressed condition.

8. The coupling of claim 7 wherein said spring is disposed in respective cutouts of said first and second halves.

9. The coupling of claim 8 wherein said wedge-shaped cup means forms a radially outer support of the radial outer winding area of said spring at an outer definition of said cutouts.

10. The coupling of claim 7 wherein said spring is in a bent position defining an overall radius of curvature that is smaller than the radius of curvature of any of said sub-sections.

11. The coupling of claim 7 wherein said wedge-shaped cup means forms a side guide of said spring within said halves.

12. The coupling of claim 11 wherein said spring is disposed in respective cutouts in said first and second halves and including spring plates in the cutouts on which ends of said spring bear.

13. The coupling of claim 7 wherein said spring is disposed in respective cutouts in said first and second halves and including spring plates in the cutouts on which ends of said spring bear.

14. The coupling of claim 13 wherein each of the spring plates includes a cylindrical projection adapted to receive ends of the spring.

15. The coupling of claim 7 wherein said spring is disposed in respective cutouts in said first and second halves, and including spring plates in the cutouts on which ends of said spring bear, and including guide pieces guiding said spring at a radial outer definition of said cutouts.

16. The coupling of claim 7 wherein said wedge-shaped cup means consists essentially of a material having high strength, low specific gravity, resistance to abrasion and high temperature, and resistance to lubricant within the coupling.

17. The coupling of claim 16 including a plurality of said wedge-shaped coupling means subdividing said spring into at least three subsections.

18. The coupling of claim 17 wherein said spring is disposed in respective cutouts of said first and second halves, said wedge-shaped cup means forming a radially outer support of the radially outer winding area of said spring at an outer definition of said cutouts.

* * * * *